3,397,275
METHODS FOR CONTROLLING OR ERADICATING INSECTS WITH QUATERNARY AMINE STERILANTS
Philip C. Hamm, Glendale, Mo., assignor to Monsanto Company, St. Louis, Mo., a corporation of Delaware
No Drawing. Filed Jan. 25, 1967, Ser. No. 611,545
10 Claims. (Cl. 424—329)

ABSTRACT OF THE DISCLOSURE

Compounds of the following formula are insect chemosterilants:

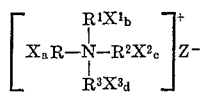

wherein R, $R^1$, $R^2$ and $R^3$ are selected from the group consisting of alkyl and alkenyl of not more than 18 carbon atoms, X, $X^1$, $X^2$, $X^3$ and Z are halogen (Cl, Br, F and I) and $a$, $b$, $c$ and $d$ are each integers of 0 to 3.

---

This invention relates to chemosterilant compositions and to methods for the control or eradication of insect populations.

The term "insect" is used herein in its broad common usage to include spiders, mites, ticks and like pests which are not in the strict biological sense classified as insects. Thus, the usage herein conforms to the definitions provided by Congress in Public Law 104, the "Federal Insecticide, Fungicide, and Rodenticide Act" of 1947, Section 2, subsection $h$, wherein the term "insect" is used to refer not only to those small invertebrate animals belonging mostly to the class Insecta, comprising six-legged usually winged forms, as beetles, bugs, bees, flies, and so forth, but also to other allied classes of arthropods whose members are wingless and usually have more than six legs, as spiders, mites, ticks, centipedes, and wood lice.

In accordance with this invention it has been found that insects can be controlled or eradicated by a method which comprises exposing the insect to a sterilizing amount of a compound of the formula

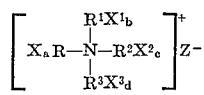

wherein R, $R^1$, $R^2$ and $R^3$ are selected from the group consisting of alkyl and alkenyl of not more than 18 carbon atoms, X, $X^1$, $X^2$, $X^3$ and Z are halogen (Cl, Br, F and I) and $a$, $b$, $c$, and $d$ are each integers of 0 to 3.

In the above formula $RX_a$, $R^1X^1_b$, $R^2X^2_c$ and $R^3X^3_d$ can be alkyl (1 to 18 carbon atoms), for example, methyl, ethyl, n-propyl, isopropyl, n-butyl, sec-butyl, isobutyl, tert-butyl, amyl, hexyl heptyl octyl nonyl decyl, dodecyl tetradecyl, hexadecyl, octadecyl and the various homologues and isomers of alkyl having from 1 to 18 carbon atoms, alkenyl (2 to 18 carbon atoms), for example vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologues and isomers of alkenyl having 2 to 18 carbon atoms, haloalkyl such as chloromethyl, iodomethyl, bromomethyl, fluoromethyl, chloroethyl, iodoethyl, bromoethyl, fluoroethyl, dichloroethyl, diiodoethyl, dibromoethyl, difluoroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromo hexyl, 2,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-dichloromethyl heptyl, chlorooctyl, bromooctyl, iodooctyl, 2,4-dichloro methylhexyl, 2,4 - dichlorooctyl, 2,4,4 - trichloromethyl pentyl, 1,3,5-tribromooctyl and the halogenated straigh and branched chain nonyl, decyl, undecyl, dodecyl, tri decyl, tetradecyl, pentadecyl hexadecyl, heptadecyl anc octadecyl, and haloalkenyl such as chlorovinyl, bromo vinyl, chloroallyl, bromoallyl, 3-chloro-n-butenyl-1, 3 chloro-n-pentenyl-1, 4-chloro-n-hexenyl-2, 3,4-dichloro methylpentenyl-1, 3-fluoro-n-heptenyl-1, 1,3,3-trichloro n-heptenyl-5, 1,3,5-trichloro-n-octenyl-6, 2,3,3-trichloro methylpentenyl-4 and the various homologues anc isomers of haloalkenyl having 2 to 18 carbon atoms.

For the sake of brevity, the compounds of the abovε formula which are useful in the compositons and method: of this invention are referred to hereinafter as "chemo sterilants."

In carrying out the methods of this invention, the chemosterilants, admixtures thereof or compositions con taining them are applied to the insects or to their environ ment in an amount sufficient to exert a sterilizing action The chemosterilant compositions of this invention gen erally contain from about 0.001% to about 99.99% bȝ weight of chemosterilant. The lower concentrations o: chemosterilant are particularly effective when the com positions are liquid, but it is preferred to use higher con centrations of chemosterilant when the compositions arε semi-solid or solid. Compositions comprising from abou 0.001% to about 5% by weight of chemosterilant arε preferred with those comprising from about 0.001% tc abount 2% by weight being particularly advantageous. A wide variety of insects, for example, house flies (*Muscα domestica*), screw-worm flies (*Cochliomyia homini vorax*), Mexican fruit flies (*Anastrepha ludens*), orienta fruit fly, vinegar flies, eye gnats, stable flies, mosquitoes boll weevils, pomace flies (*Drosophila melanogaster*) Mediterranean fruit flies, cotton bollworm, codling moth plum curculio, and the like, can be controlled or eradi cated in accordance with the methods of this invention.

Representative chemosterilants which can be used ir the compositions and methods of this invention includε the following:

allyl tributylammonium iodide
allyl tributylammonium chloride
allyl tributylammonium bromide
allyl tributylammonium fluoride
allyl trioctylammonium iodide
allyl trioctylammonium chloride
octadecyl trimethylammonium iodide
octadecyl trimethylammonium bromide
octadecyl triallylammonium iodide
2-butenyl trimethylammonium iodide
dibutyl dimethylammonium iodide
2-chlorobutenyl trimethylammonium iodide
2-chlorobutenyl tributylammonium iodide
2-chlorobutenyl tributylammonium chloride
2-chloroallyl triethylammonium iodide
2-chloroallyl triethylammonium bromide
2-chloroallyl triethylammonium chloride
2-chloroallyl tri(chloromethyl)ammonium iodide
2-chloroallyl tri(chloromethyl)ammonium bromide
2-chloroallyl tri(3,3-dichlorooctyl)ammonium iodide
dimethyl allyl butylammonium iodide
dimethyl propenyl butylammonium iodide The following examples will illustrate the invention Parts and percent are by weight unless otherwise indi cated.

Example 1.—(Screw-worm fly)

Allyl trimethylammonium iodide and 2-chloroallyl trimethylammonium iodide are tested against the screw-worm fly using the following procedure:

Tests are made with adult screw-worm flies less than 24 hours old. The flies are fed a freshly prepared quantity of sugar syrup containing the chemosterilant for 5 days. After the fifth day, ample quantities of meat, untreated honey and water are provided so that the flies can feed freely. On the eighth day following oral application of the chemosterilant, the females are given the opportunity to lay eggs which are subsequently observed for hatching. The chemosterilants are rated on the basis of no oviposition or failure of eggs to hatch. With allyl trimethylammonium iodide at 1.0% concentration oviposition is reduced and no eggs hatch. With 2-chloroallyl trimethylammonium iodide at 0.5% concentration oviposition is reduced and no eggs hatch.

In carrying out the methods of this invention, the chemosterilants can be used alone or in combination with an adjuvant in liquid, solid or gaseous form. The chemosterilant compositions of this invention are prepared by admixing the chemosterilant with an adjuvant including diluents, extenders, carriers and conditioning agents to provide compositions in the form of finely-divided particulate solids, semi-solids, aerosols, solutions and dispersions or emulsions. Thus the chemosterilant can be used with an adjuvant such as a finely-divided particulate solid, a liquid of organic origin, water, a wetting agent, dispersing agent, an emulsifying agent or any suitable combination of these.

Typical finely-divided solid carriers and extenders which can be used in the chemosterilant compositions of this invention include for example, the talcs, clays, pumice, silica, diatomaceous earth, quartz, fuller's earth, salt, sulfur, powdered cork, powdered wood, walnut flour, chalk, tobacco dust, volcanic ash, cottonseed hulls, wheat flour, soybean flour, tripoli, ground corn cobs, charcoals and the like. Typical liquid diluents include for example, kerosene, Stoddard solvent, hexane, benzene, toluene, water, acetone, ethylene dichloride, xylene, alcohols, diesel oil, glycols and the like. Typical liquified gasses for aerosols include for example, haloalkyls such as dichlorodifluoromethane, fluorotrichloromethane, and the like. Typical semi-solid extenders include for example, soap, petroleum jelly, and the like.

The chemosterilants also can be employed in conjunction with attractants for the particular insect being controlled. For example, they can be applied to or admixed with attractants or baits such as sucrose, glucose, molasses, protein mixtures, powdered egg yolk, powdered milk, yellow corn grits, quincy granules, pumice granules, sex attractants, and the like.

The chemosterilant compositions of this invention, particularly liquids and wettable particles, usually contain as a conditioning agent one or more surface active agents in amounts sufficient to render a given composition readily dispersible in water or in oil. By the term "surface-active agent" it is understood that wetting agents, dispersing agents, suspending agents and emulsifying agents are included therein.

The term "chemosterilant composition" as used herein and in the appended claims includes not only compositions in a suitable form for application but also concentrated compositions which require dilution or extension with a suitable quantity of liquid or solid adjuvant prior to application.

Surface-active agents which can be used in the chemosterilant compositions of this invention are set out, for example, in Searle U.S. Patent 2,426,417, Todd U.S. 2,655,447, Jones U.S. Patent 2,412,510 and Lenher U.S. Patent 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), J. W. McCutcheon, Inc., and Bulletin E–607 of the Bureau of Entomology and Plant Quarantine of the U.S.D.A. In general, less than about 50 parts by weight of the surface active agent is present per 100 parts by weight of chemosterilant composition.

The preferred chemosterilant compositions are the wettable powders, dusts, aqueous suspensions or solutions, hydrocarbon solutions and emulsifiable oils.

Wettable powders are water-dispersible compositions containing one or more chemosterilant, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols and polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of chemosterilant, from about 0.25 to about 25 parts of wetting agent, from about 0.25 to about 25 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Dusts are dense finely divided particulate compositions which are intended for application in dry form. Dusts are characterized by their free-flowing and rapid settling properties so that they are not readily wind-borne to areas where they are of no value. Dusts contain primarily a chemosterilant and a dense, free-flowing, finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for phytotoxic dusts include micaceous talcs, pyrophyllite, dense kaolin clays, ground calcium phosphate rock and tobacco dust.

The wettable powders described above can also be used in the preparation of dusts. While such wettable powders can be used directly in dust form, it is more advantageous to dilute them by blending with the dense dust diluent. In this manner, dispersing agents, corrosion inhibitors and anti-foam agents may also be found as components of a dust.

Emulsifiable oils are usually solutions of chemosterilant in water-immiscible or partially water-immiscible solvents together with a surfactant. Suitable solvents for the active ingredient of this invention include hydrocarbons and certain water-immiscible ethers, esters or ketones. Suitable surfactants are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredients, about 1 to 50 parts surfactant and about 4 to 94 parts solvent, all parts being by weight based on the total weight of emulsifiable oil.

Although the invention is described with respect to specific modifications, the details thereof are not to be construed as limitations except to the extent indicated in the following claims.

The embodiments of the invention in which an exclusive property or privilege is claimed are defined as follows:

1. A method for the control or eradication of insects which comprises the oral administration to said insects of a sterilizing amount of a compound of the formula

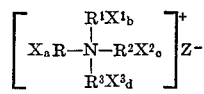

wherein R, $R^1$, $R^2$ and $R^3$ are selected from the group consisting of alkyl and alkenyl of not more than 18 carbon atoms, X, $X^1$, $X^2$, $X^3$ and Z are halogen and $a$, $b$, $c$ and $d$ are each integers of 0 to 3.

2. Method of claim 1 wherein R, $R^1$ and $R^2$ are alkyl, $R^3$ is alkenyl and $a$, $b$ and $c$ are zero.

3. Method of claim 1 wherein $R^3$ is allyl and $d$ is zero.

4. Method of claim 1 wherein $R^3$ is allyl, $X^3$ is Cl and $d$ is one.

5. Method of claim 1 wherein the compound is allyl trimethylammonium iodide.

6. Method of claim 1 wherein the compound is 2-chloroallyl trimethylammonium iodide.

7. Method of claim 2 wherein Z is iodine.

8. Method of claim 3 wherein Z is iodine.

9. Method of claim 4 wherein Z is iodine.

10. The method of claim 1 wherein the insects are flies.

References Cited

Chem. Abst. (I) 48, p. 4123e (1954).
Chem. Abst. (II) 50, pp. 5628–5629 (1956).
Chem. Abst. (III) 55, pp. 5847–5848 (1956).

ALBERT T. MEYERS, *Primary Examiner.*

S. FRIEDMAN, *Assistant Examiner.*